United States Patent
Herup et al.

(10) Patent No.: US 6,231,710 B1
(45) Date of Patent: May 15, 2001

(54) METHOD OF MAKING COMPOSITE CHAMBERCORE SANDWICH-TYPE STRUCTURE WITH INHERENT ACOUSTIC ATTENUATION

(75) Inventors: Eric Herup, Albuquerque; Steven Huybrechts, Sandia Park; Steven Griffin, Albuquerque, all of NM (US); Stephen Tsai, Palo Alto, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/326,058

(22) Filed: Jun. 4, 1999

(51) Int. Cl.$^7$ .................................................. B65H 81/00
(52) U.S. Cl. ...................... 156/173; 156/169; 156/175; 181/292
(58) Field of Search ................................. 156/173, 175, 156/169; 181/288, 284, 292, 290

(56) References Cited

U.S. PATENT DOCUMENTS

| | | | |
|---|---|---|---|
| 2,755,216 | * | 7/1956 | Lemons . |
| 3,490,983 | * | 1/1970 | Lee . |
| 3,795,559 | * | 3/1974 | Horn et al. . |
| 4,025,675 | * | 5/1977 | Jonda . |
| 4,433,021 | * | 2/1984 | Riel ................................. 181/292 X |
| 4,600,619 | * | 7/1986 | Chee et al. ........................... 156/173 |
| 5,025,888 | * | 6/1991 | Arcas et al. ..................... 181/286 X |

OTHER PUBLICATIONS

Leppington, F. G, K. H. Heron, E. G. Broadbent, and S. M. Mead, "The Acoustic Transmission Properties of Anisotropic Sandwich Panels With Perforations," Proc. R. Soc. Lond. A 428, 27–47, 1990.

* cited by examiner

Primary Examiner—Jeff H. Aftergut
(74) Attorney, Agent, or Firm—Kenneth E. Callahan

(57) ABSTRACT

An innovative new structure, called ChamberCore, is disclosed that is damage tolerant, easy to manufacture, and has an inherent design feature that can be exploited to drastically reduce acoustic transmission through the structure. The structure is composed of previously cured tubes that are sectioned to form chambers and co-cured with facesheets to form a sandwich-type structure. Damage tolerance is derived from the fact that the structure has no weak facesheet-core interface as found in traditional sandwich-type structures. Additionally, each chamber has a hole to it through the inner facesheet effectively converting it into a Helmholtz resonator. These resonators can be tuned to attenuate broadband or specific acoustic transmission through the structure.

4 Claims, 2 Drawing Sheets

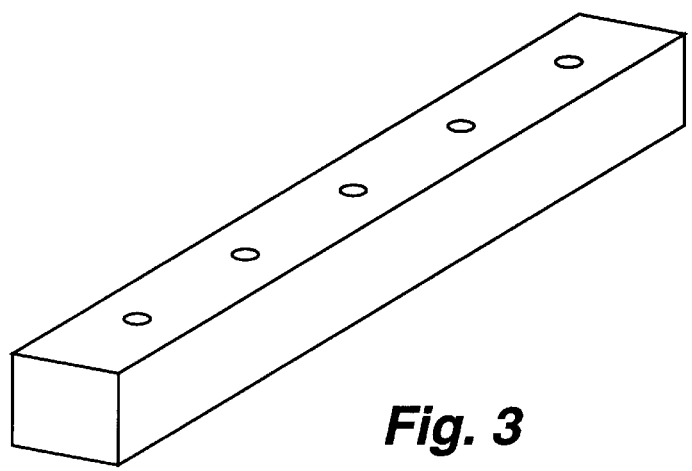
Fig. 3
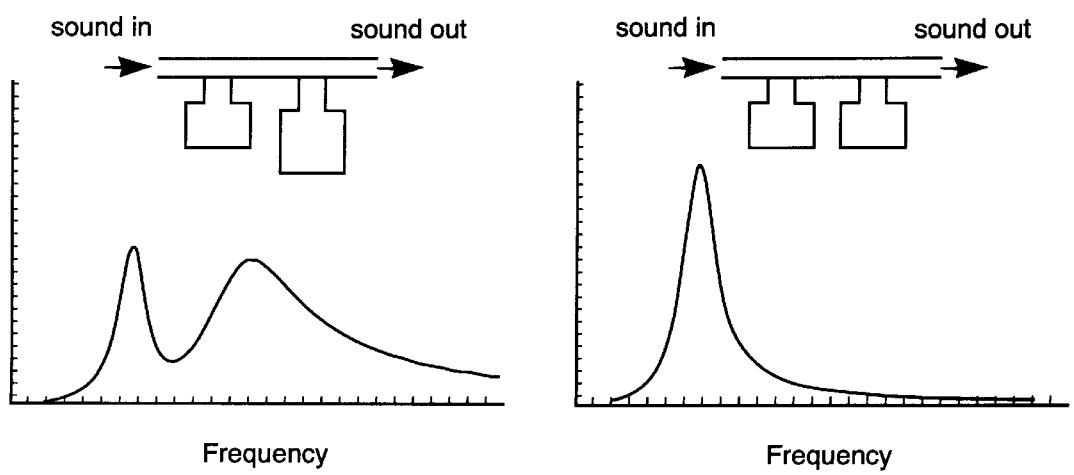
Fig. 4a  Fig. 4b

METHOD OF MAKING COMPOSITE CHAMBERCORE SANDWICH-TYPE STRUCTURE WITH INHERENT ACOUSTIC ATTENUATION

STATEMENT OF GOVERNMENT INTEREST

The conditions under which this invention was made are such as to entitle the Government of the United States under paragraph 1(a) of Executive Order 10096, as represented by the Secretary of the Air Force, to certain rights in the invention.

BACKGROUND OF THE INVENTION

1. Field of the Invention

This invention is in the field of sandwich-type structural materials, and in particular relates to sandwich-type structural materials with acoustic attenuation characteristics.

2. Description of the Prior Art

Existing launch vehicle and aircraft structures are still overwhelmingly fabricated using aluminum and steel. These materials are often very heavy for this weight critical application by today's structural standards. These materials are utilized, though, due to their damage tolerance and low cost manufacturing techniques. Aerospace structures that are fabricated using advanced composite materials, while lighter weight, suffer from poor damage tolerance and very high manual labor requirements during fabrication.

An additional problem, specific to launch vehicles, is that a significant number of spacecraft failures can be attributed to the conditions experienced by the spacecraft during launch into orbit. These conditions include very high accelerations, severe vibration due to lift-off and staging and very high broadband acoustic levels, particularly during liftoff. Current launch vehicle systems require that spacecraft be designed to withstand these high acceleration and vibration levels. To protect the spacecraft in this extreme acoustic environment, every existing launch vehicle system incorporates very heavy acoustic blankets and distributed masses in the fairing surrounding the payload area of the vehicle.

The Boeing Company's "MacroCore" concept incorporates Helmholtz resonators to attenuate sound. Although a very good idea, this structural concept requires a wall thickness that is unrealistic for most launch vehicle applications. The Helmholtz resonators, in this concept, are a product of the sandwich core construction, and are, therefore, limited by the sandwich core concept. Specifically, this concept is susceptible to the weaknesses of core/facesheet delamination and moisture retention.

Leppington discusses the use of perforated facesheets to create Helmholtz resonators out of honeycomb core pockets (Leppington, F. G, K. H. Heron, E. G. Broadbent, and S. M. Mead, "The Acoustic Transmission Properties of Anisotropic Sandwich Panels With Perforations," Proc. R. Soc. Lond. A 428, 27–47, 1990). This structure is limited in that it is, similar to the MacroCore concept, basically a sandwich core construction. Therefore, it is limited in that it is susceptible to facesheet/core delamination and moisture incursion. Additionally, the structural requirements on the core material drives the resonator volume which, for any practical geometry, is targeted at a frequency range higher than that which is useful for launch vehicle applications.

U.S. Pat. No. 3,831,710 entitled "Sound Absorbing Panels" incorporated Helmholtz resonators into a sandwich core structural concept. This concept visualizes the incorporation of Helmholtz resonators into structures but doesn't describe how such structures could be constructed. The concept envisions "grid-stiffened" structures to create this geometry. "Grid-Stiffened" structures have not, to date, been fabricated in this form and are very difficult to fabricate in the geometry envisioned by the patent.

SUMMARY OF THE INVENTION

An innovative new structure has been developed that is inherently damage tolerant, easy to manufacture, and has an inherent design feature that can be exploited to drastically reduce acoustic transmission through the structure. This structure is being called "ChamberCore."

The structure is composed of previously cured tubes that are sectioned to form chambers and co-cured with facesheets to form a sandwich-type structure. Each chamber has a hole to it through the inner facesheet effectively converting it into a Helmholtz resonator. These resonators can be tuned to attenuate broadband or specific acoustic transmission through the structure.

There are a number of manufacturing advantages to ChamberCore, including reduced stiffener fabrication cost, core placement cost and scrap material. The result is a high-quality co-cured structure fabricated with low cost methods and having very simple tailoring of axial-hoop properties. Structurally, ChamberCore is damage tolerant due to its lack of a honeycomb/facesheet interface. It is lighter weight than traditional sandwich constructions and results in a very high strength core-facesheet bond. ChamberCore also provides broadband acoustic attenuation that can be tailored to specific acoustic environments. Enclosed structures fabricated of ChamberCore produce a reduction in both the internal sound level and in sound through transmission.

BRIEF DESCRIPTION OF THE DRAWINGS

FIG. 3 shows the Helmholtz resonator concept applied to a tube.

FIG. 4a is a plot of the acoustic attenuation vs. frequency for variable volume Helmholtz resonators in a tube.

FIG. 4b is a plot of the acoustic attenuation vs. frequency for equal volume Helmholtz resonators in a tube.

DESCRIPTION OF THE PREFERRED EMBODIMENT

Figure 1:
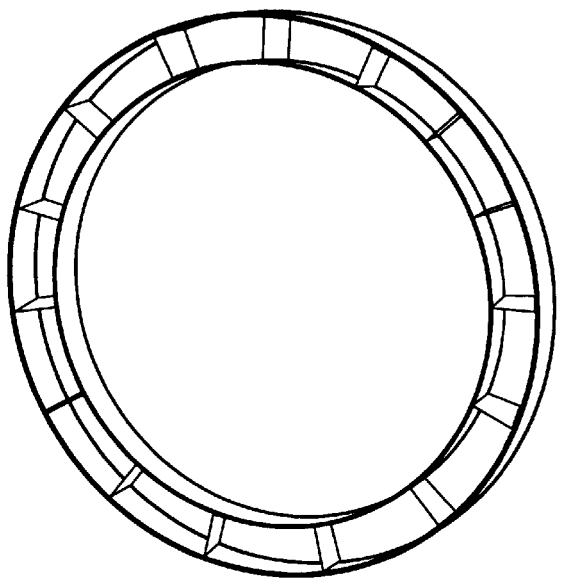
FIG. 1 is a cross-section of a ChamberCore cylindrical structure.
Figure 2:
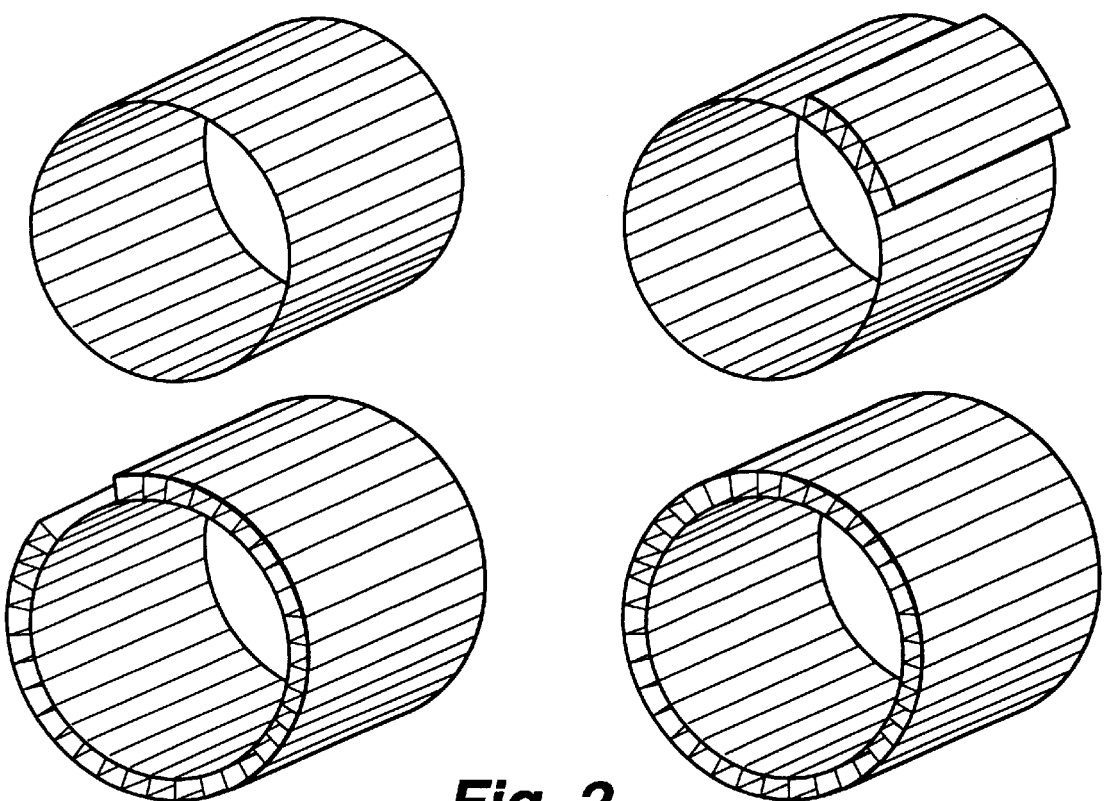
FIG. 2 shows the step-by-step fabrication of a ChamberCore cylindrical structure.

A cross-section of a ChamberCore cylindrical section is shown in FIG. 1. The manufacturing process is shown in the sequence of FIG. 2. The inner skin (upper left of FIG. 2) is filament wound using a composite material such as graphite epoxy, kelvar epoxy, or glass cynate ester. Long wedge-cross-section tubes are then placed around the inner skin (top right, bottom left) before the inner skin is cured. These wedge sections can either be pre-cured using a match-metal mold process or can be uncured composite plies wrapped around solid rubber plugs. An outer skin is wound over the tubes (bottom right) and the entire assembly is cured in either an autoclave or oven.

An alternative fabrication method is to wrap the composite material (graphite epoxy) that forms the tubes around solid rubber plugs. These wrapped plugs are then placed on the inner skin and the outer skin wound on top as described above. The entire construction is then co-cured in an autoclave or oven.

In addition to the manufacturing advantages, the tubes can easily be sectioned into smaller acoustic cavities by adding plugs in the tubes at set locations. A hole is cut into each of these acoustic cavities from the inside to form individual Helmholtz resonators. A Helmholtz resonator is an enclosure with a small opening that resonates at a single frequency. The frequency is determined by the geometry of the resonator. If the damping of the resonance is adjusted correctly, a Helmholtz resonator can significantly decrease transmitted acoustic energy. The damping is determined by geometrical parameters in the resonator and can be further increased by the addition of flow resistance materials in the hole. FIG. 3 illustrates this concept on an individual tube. Each of the tubes in the ChamberCore structure is then a series of Helmholtz resonators. There is a wall between each pair of holes in the tube of FIG. 3.

A particular application of the ChamberCore concept is to launch vehicle shrouds or fairings. A shroud constructed using the ChamberCore concept can have a significant impact on its weight, a critical parameter in launch vehicles. Not only is load-bearing structure weight and manufacturing cost reduced, but a significant amount of the acoustic treatment, traditionally found in launch vehicle fairings, can be eliminated. The resonators in the ChamberCore can be "tuned" to the frequencies of greatest difficulty to the particular structure. Since the resonant frequency of each resonator is determined by its geometry, the selection of resonant frequencies will, to some extent, be constrained by the geometry of the ChamberCore shroud. Also, since the ambient launch noise is broadband in nature, the frequencies selected for each resonator would be such that they are closely spaced and overlapping in the frequency region where attenuation is desired. FIG. 4 illustrates how the selection of geometrical parameters in two resonators can achieve transmission loss over a broader bandwidth than that achieved with two identical resonators at the expense of the absolute amplitude of the achievable transmission loss.

ChamberCore structures are applicable to many structures where light weight and acoustic attenuation are issues. Examples of other uses for ChamberCore are aircraft, submarines, automobiles, and helicopters.

We claim:

1. A method of manufacturing a sandwich structure having an inner and outer filament wound skin with acoustic attenuation properties, the method comprising:
   a. pre-fabricating wedge-shaped composite material tubes sectioned to form chambers of variable volumes;
   b. fabricating a filament wound composite material inner skin in a generally cylindrical shape;
   c. placing the pre-fabricated tubes around an outside surface of the inner skin such that a longitudinal axes of the tubes are parallel to a longitudinal axis of the inner skin;
   d. fabricating a filament wound composite material outer skin over the pre-fabricated tubes to form an entire assembly;
   e. curing the entire assembly in an autoclave or oven; and
   f. drilling a hole through the inner skin and into each chamber of each tube to thereby convert each chamber into a Helmholtz resonator, thereby constructing a lightweight, strong, and acoustic attenuating structure.

2. The method of manufacture of claim 1 wherein said composite material consists of either graphite epoxy, kelvar epoxy, or glass cynate ester.

3. The method of manufacture of claim 1 wherein the pre-fabricating wedge-shaped composite material tubes sectioned to form chambers step fabricates said tubes using uncured composite plies wrapped around solid rubber plugs.

4. The method of manufacture of claim 1 wherein the pre-fabricating wedge-shaped composite material tubes sectioned to form chambers step fabricates said tubes using a match-metal mold process.

* * * * *